Patented June 16, 1925.

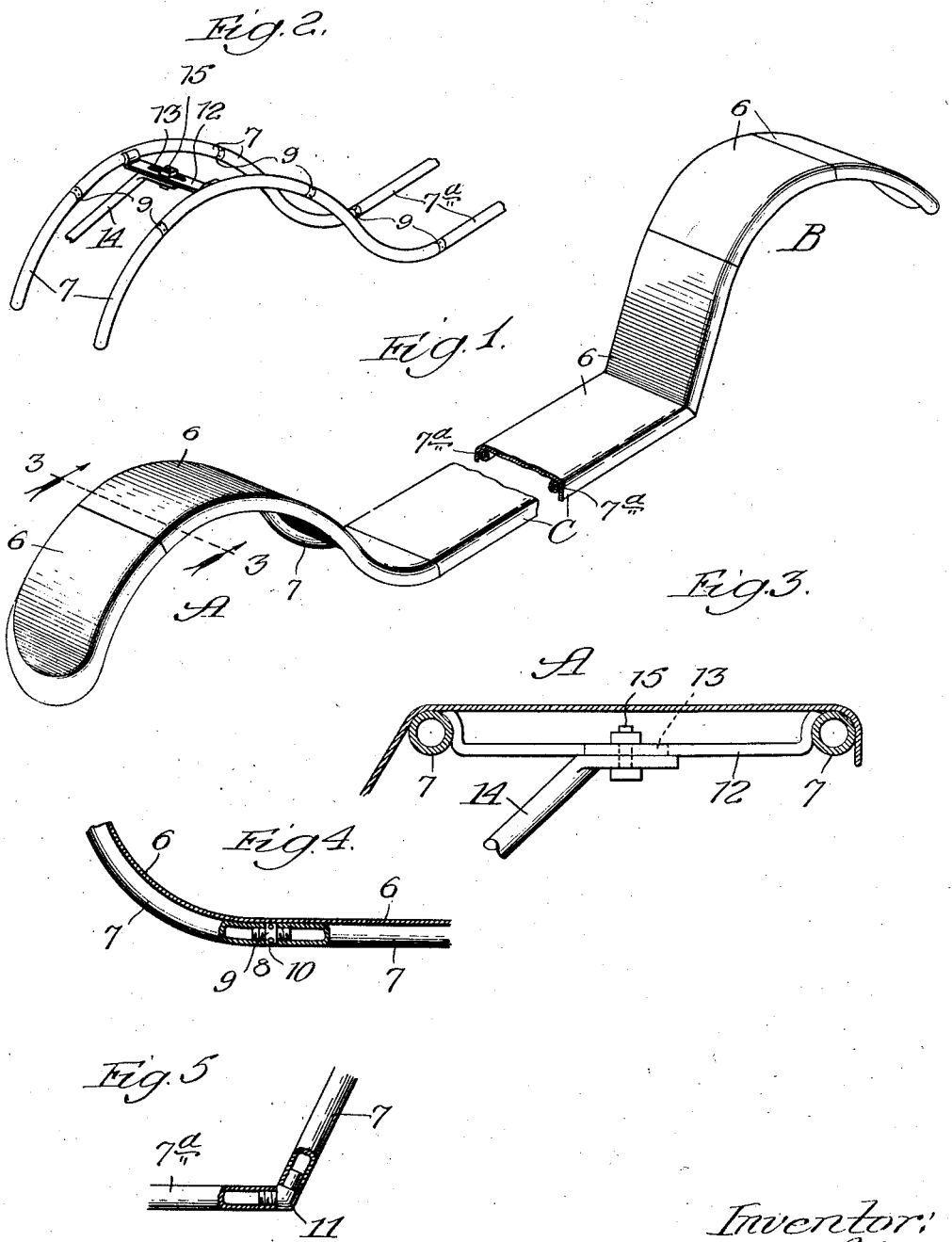

1,542,469

UNITED STATES PATENT OFFICE.

BERNARD NELSON, OF CHICAGO, ILLINOIS.

AUTOMOBILE FENDER.

Application filed December 3, 1924. Serial No. 753,635.

*To all whom it may concern:*

Be it known that I, BERNARD NELSON, a citizen of the United States, residing at Chicago, in the county of Cook and State of Illinois, have invented a new and useful Improvement in Automobile Fenders, of which the following is a specification.

The fender or mud-guard on an automobile is the feature thereof most liable to injury in collisions, owing to exposure thereto. In instances where the resultant damage only amounts to more or less slight mutilation of the fender, as by mere indenting or bending thereof at one or more points, it may be repaired by straightening; whereas, when the damage is more serious, even when inflicted upon only a relatively small part of the fender, and cannot be repaired in the manner thus suggested, either at all or without showing objectionable marring or disfigurement, the condition requires an entirely new fender to replace the one thus destroyed or damaged.

To overcome this requirement and, besides, render the fender less liable to injury, I construct it of a plurality of separable or releasably joined sections.

A preferred form of my improvement for accomplishing the aforesaid purposes is illustrated in the accompanying drawing, in which—

Figure 1 is a broken perspective view showing, suitably connected with an automobile running-board, front and rear fenders of my improved sectional construction;

Figure 2 is a similar view of means, shown as adapted only for the front fender, but used for reinforcing the edges of the sheet-metal of both fenders, and showing a brace-bar and bracket for securing, as usual, to the chassis of an automobile;

Figure 3 is a section on line 3—3, Fig. 1;

Figure 4 is a broken sectional view showing, as applied to the forward end of the running-board, a preferred construction of union for joining adjacent sections of each fender, and Figure 5 is a similar view showing a preferred construction of union for joining to the rear edge of the running-board the adjacent section of the rear fender.

The front fender A and preferably also the rear fender B are each formed of sections 6 of suitable shape or curvature, separably joined together in series, the inner end section of each being similarly joined, respectively, to the opposite ends of the running-board C.

As preferred means for reinforcing the sheet-metal of which the fenders are usually formed, I secure, as by brazing, in the opposite downwardly-bent lateral edge portions of each section 6 and of the running-board, reinforcing members, each being a section of piping 7, which may be ordinary gas-pipe, of suitable diameter, extending somewhat short of the ends of the member reinforced thereby; and adjacent ends of these pipe-sections are internally threaded, as represented.

The means illustrated in Fig. 4 for separably uniting successive sections 6 and the inner-end of the front fender A to the running-board, comprise a union 8 provided with right and left threads respectively on its opposite ends and with an intermediate head 9, that represented being of the kind containing a plurality of holes 10 at suitable intervals about its periphery, to receive a tool by which to turn the union for screwing it into and out of the joined pipe-ends. The means shown in Fig. 5 for joining the section 6, forming the inner end of the rear fender, to the pipe-sections 7ª extending, as represented in Fig. 1, along the opposite edge-portions of the running-board, to which they are secured, comprise an angular union 11 threaded on one end to screw into the end of the respective pipe 7ª and projecting at its opposite unthreaded end into the adjacent end of the respective pipe 7, wherein it may be pinned or otherwise fastened. The successive sections may be thus joined together with the opposing edges of the sheet-metal abutting to provide an unbroken surface to the structure.

A brace-bar 12 is shown, in Figs. 2 and 3, extending between reinforcing pipe-sections with its upturned ends fitting against them, and which are secured thereto as by brazing or otherwise. Such bar may be provided for any desired number of the sections 6; and each contains a central longitudinal slot 13, at which a bracket 14 is connected by a bolt 15 for adjustably fastening the fender to an automobile-chassis (not shown).

My improved construction enables a damaged fender, when the injury is not beyond desirable repair, to be saved from discarding for entire replacement, by removing the impaired section or sections 6, and replacing each with a new one. To take out such a section it is only necessary to free it for withdrawal by unscrewing the proper unions, and a new section may be readily substituted by screwing such unions into place. In the case of the joints at 11, the pipes 7 will be unfastened to release, when necessary, the rear fender, or the innermost section thereof, and enable it to be withdrawn.

The jointed construction of the fender tends, furthermore, to render it somewhat yielding transversely and therefore less susceptible to mutilation under collision.

I realize that considerable variation is possible in the details of construction herein shown and described, and I do not intend, by illustrating or describing a single specific or preferred embodiment of my invention, to be limited thereto, it being my intention by the appended claims to claim protection for all the novelty there may be in my invention as fully as the state of the art will permit.

I claim:

1. An automobile fender comprising a plurality of assembled successive sections, each section having its lateral edges reinforced by open-ended members at which successive sections are separably joined together.

2. An automobile fender comprising a plurality of successive sheet-metal sections having down-turned lateral edges, reinforcing members extending along said edges short of the sheet-metal, and unions separably connecting successive members.

3. An automobile fender comprising a plurality of assembled successive sheet metal sections having down-turned lateral edges, reinforcing members extending along said edges short of the sheet-metal, unions releasably connecting successive members, a brace-bar connecting a pair of said members transversely thereof, and a chassis-attaching bracket extending from the brace-bar.

4. An automobile fender comprising a plurality of separable sheet-metal sections, pipe-sections secured to and extending along the lateral edges of the sheet-metal sections, unions releasably connecting successive pipe-sections, a brace-bar connecting a pair of said pipe-sections, and a chassis-attaching bracket adjustably connected with said brace-bar.

5. In combination with an automobile running-board, a fender comprising a plurality of sections having reinforcing members extending along their lateral edge-portions, reinforcing members extending along the lateral edge-portions of the running-board, unions releasably connecting the successive sections at the opposing ends of their reinforcing members, and unions similarly connecting said members on the innermost section endwise with said members on the running-board.

6. In combination with an automobile running-board, a fender comprising a plurality of sheet-metal sections having threaded pipe-sections secured to and extending along their lateral edge-portions, similar pipe-sections secured to and extending along the lateral edge-portions of the running-board, and unions screwing into opposing ends of successive pipe-sections and provided with heads by which to operate them.

7. In combination with an automobile running-board, a rear fender comprising a plurality of sheet-metal sections, each section having its lateral edges reinforced by members at which successive sections are releasably joined together, open-ended reinforcing members extending along the lateral edges of the running-board, and angular unions coupling the innermost section of said fender to the running-board, said unions screwing at one end into the reinforcing members on the running-board and entering at their opposite ends the reinforcing members on said innermost section.

8. An automobile fender constructed of a plurality of assembled releasably and inflexibly joined successive sections, having rigid joining means carried by and shielded within the edge portions of the sections, and means for fastening the fender to a automobile chassis.

BERNARD NELSON.